United States Patent [19]

Singh et al.

[11] Patent Number: 5,173,365

[45] Date of Patent: Dec. 22, 1992

[54] ULTRA-THIN MOLECULAR FILM

[75] Inventors: Brij P. Singh, North Royalton; Scott E. Rickert, Lakewood, both of Ohio

[73] Assignee: NanoFilm Corporation, Valley View, Ohio

[21] Appl. No.: 723,828

[22] Filed: Jul. 1, 1991

Related U.S. Application Data

[60] Division of Ser. No. 641,855, Jan. 16, 1991, Pat. No. 5,106,561, which is a continuation of Ser. No. 321,088, Mar. 9, 1989, abandoned, which is a continuation-in-part of Ser. No. 715,520, Mar. 25, 1985, abandoned.

[51] Int. Cl.[5] ............................................. B32B 3/00
[52] U.S. Cl. .................................. 428/333; 428/332; 428/334
[58] Field of Search ......................................... 428/333

[56] References Cited

U.S. PATENT DOCUMENTS

| | | | |
|---|---|---|---|
| 2,607,081 | 8/1952 | Taylor | 264/165 |
| 3,767,737 | 10/1973 | Lundstrom | 264/41 |
| 3,876,738 | 4/1975 | Marinaccio | 264/41 |
| 3,892,665 | 7/1975 | Steigelmann et al. | 264/41 |
| 4,103,064 | 7/1978 | McAlear et al. | 428/333 |
| 4,235,958 | 11/1980 | Barraud et al. | 430/281 |
| 4,489,133 | 12/1984 | Kornberg | 428/408 |
| 4,765,939 | 8/1988 | Kohn | 264/298 |
| 4,822,853 | 4/1989 | Uekita et al. | 528/125 |
| 4,897,461 | 1/1990 | Uekita et al. | 528/125 |
| 4,970,120 | 11/1990 | Laschewsky et al. | 428/411.1 |

FOREIGN PATENT DOCUMENTS

| | | | |
|---|---|---|---|
| 31725 | 7/1981 | European Pat. Off. | 264/298 |
| 1050028 | 2/1959 | Fed. Rep. of Germany | 264/298 |
| 193537 | 10/1985 | Japan | 264/298 |

OTHER PUBLICATIONS

European Search Report (3 pages).
English translation of German 1,050,028.
English translation of Japanese 60-193, 537.
Blodgett, K. B., "Film Built by Depositing Successive Monomolecular Layers on a Solid Surface", Journal of the American Chemical Society, vol. 57, (Jun. 1935), pp. 1007-1022.

Primary Examiner—Paul J. Thibodeau
Assistant Examiner—Mark Forman
Attorney, Agent, or Firm—Jones, Day, Reavis & Pogue

[57] ABSTRACT

An ultra-thin, self-assembling molecular film has thickness, length and width dimensions. Ampliphilic molecules in the film are ordered in the thickness dimension, and are arranged in crystals that are aligned in both the length and width dimensions. This molecular alignment in all three film dimensions provides a film having more uniform properties.

12 Claims, 5 Drawing Sheets

ULTRA-THIN MOLECULAR FILM

This application is a division of U.S. patent application Ser. No. 07/641,855 filed Jan. 16, 1991, now U.S. Pat. No. 5,106,561, which in turn is a continuation of U.S. patent application Ser. No. 07/321,088 filed Mar. 9, 1989 (now abandoned), which in turn is a continuation-in-part of U.S. patent application Ser. No. 715,520 filed Mar. 25, 1985 now abandoned, the disclosure of which is hereby incorporated herein by reference.

BACKGROUND OF THE INVENTION

This application relates to ultra-thin films, and to apparatus and methods for making such films. The invention is particularly applicable to self-assembling molecular films and will be described with particular reference thereto. However, it will be appreciated that the invention has broader aspects and can be used for making other types of films, such as polymer thin films.

Known techniques for making thin films, such as the conventional Langmuir-Blodgett technique, Katharine B. Blodgett, J. Am. Chem. Soc.; (1935), 57, 1007–1022, involve dropping a solution of film-forming substrate and solvent on the surface of water, and letting the solvent evaporate. This leaves behind the amphiphilic molecules to self-assemble on the surface of water to form a film, which is then compressed to align the molecules in the film. This film has certain fixed domains and cannot be manufactured in a continuous, unbroken state.

Another technique disclosed in U.S. Pat. No. 4,765,939 involves dropping a solution of film-forming polymer and solvent on the surface of water, and allowing the solvent evaporate to air. This leaves behind a thin film membrane of the polymer formed on the surface of water. All these previous techniques for making thin films or membranes containing amphiphilic molecules or polymers are such that the molecules are arranged in random disorientation.

SUMMARY OF THE INVENTION

An ultra-thin, self-assembling molecular film has amphiphilic molecules that are ordered in one direction and are arranged in aligned units that are oriented relative to one another in two directions different from the one direction.

As used in this application, a self-assembling molecular film is one in which the molecules self-assemble into an ordered film.

A film of the type described is formed by confining the film in such a manner during its formation that the molecules are ordered in two directions, and are not allowed to become randomly disoriented, as they do in usual techniques.

In accordance with the present application, a film-forming solution containing amphiphilic molecules and solvent is delivered to an aqueous liquid or other liquids. The solvent dissolves in the aqueous liquid or other liquid and leaves behind the pure amphiphilic molecules on the surface of the aqueous liquid to solidify into an ultra-thin, self-assembling molecular film. The amphiphilic molecules from the film-forming solution self-assemble in their natural equilibrium condition.

Film made in accordance with the present application can have anywhere from 0 to 100% crystallinity. The percentage of molecules that will crystallize in the film can be controlled by adding chemicals that reduce the crystallizing action.

Even though the film has very little or not actual crystallinity, the film still has aligned regions under an optical microscope. The ordered nature of the molecules can be determined by x-ray diffraction, and the orientation of the crystals can be determined by use of an optical microscope. For convenience of description, whether the film is one having actual crystals or simply aligned regions, the crystals and regions will be referred to as aligned units. Also, reference to an ultra-thin, self-assembling molecular membrane or film is intended to include an uncrystallized film having aligned units that look like crystals but really are not true crystals. The partly or entirely uncrystallized film that has aligned units is not amorphous in the sense of the dictionary definition that means "completely lacking in organization", but is partly or completely amorphous in the sense of the dictionary definition that means "uncrystallized".

Film made in accordance with the present application can be applied to glass, ceramic or porcelain surfaces. The film can also be applied to metal, plastic and other substrate surfaces to protect and modify such surfaces. For example, polypropylene packaging does not accept many types of ink and film of the present application can be applied to the packaging for printing on the film with these inks. Film of the present application is also a very good anti-corrosion coating for metals.

The film of the present application is applied to substrates in its ultra-thin, self-assembling molecular membrane or film structure wherein each molecule can move up and down perpendicular to the plane of the film but cannot rotate or move in other directions. This helps each molecule to attach and freeze in place on the substrate surface. Tho polar groups of the film are adsorbed by a substrate surface by forces that include chemical bonding, dipolar attraction, hydrogen bonding and van der Waals forces. The film is then dried in situ on the substrate surface.

Film made in accordance with the present application can form simultaneous multilayers of individual self-assembling molecular films separated from one another by a thin film of a liquid. The number of layers formed, and the thickness of the film, can be varied by controlling; (1) the rate at which additional film-forming solution is delivered, (2) the rate at which solidified film is removed. The film-forming solution can be delivered above or below an aqueous liquid for solidification on the surface of the aqueous liquid. Stacked self-assembling molecular films from different film-forming solutions can be formed to provide a film having layers of different materials. Solidified film is removed from an aqueous liquid by lifting same at an angle preferably less than 30° in order to minimize the possibility of disrupting the self-assembling molecular nature of the film.

It is also possible to arrange layers of an aqueous liquid and an oil that is immiscible in water, and to solidify film from film-forming solution at the interface of the oil and aqueous liquid layers. It is possible to vary the density of the aqueous solution by adding variable amounts of glycerol or other substances.

It is a principal object of the present invention to provide an improved ultra-thin, self-assembling molecular film.

It is also an object of the invention to provide such a film in which the molecules are ordered and arranged in aligned units that are oriented relative to one another in two directions.

It is an additional object of the invention to provide an improved thin film for coating on substrate surfaces.

It is a further object of the invention to provide an improved apparatus and method for making an ultra-thin, self-assembling molecular film in a relatively simple, economical manner and continuous fashion not heretofore possible.

It is another object of the invention to provide an improved apparatus and method for making ultra-thin self-assembling molecular films.

It is a further object of the invention to provide such an apparatus and method for making such film in a continuous fashion not heretofore possible.

DESCRIPTION OF PREFERRED EMBODIMENTS

Figure 1:
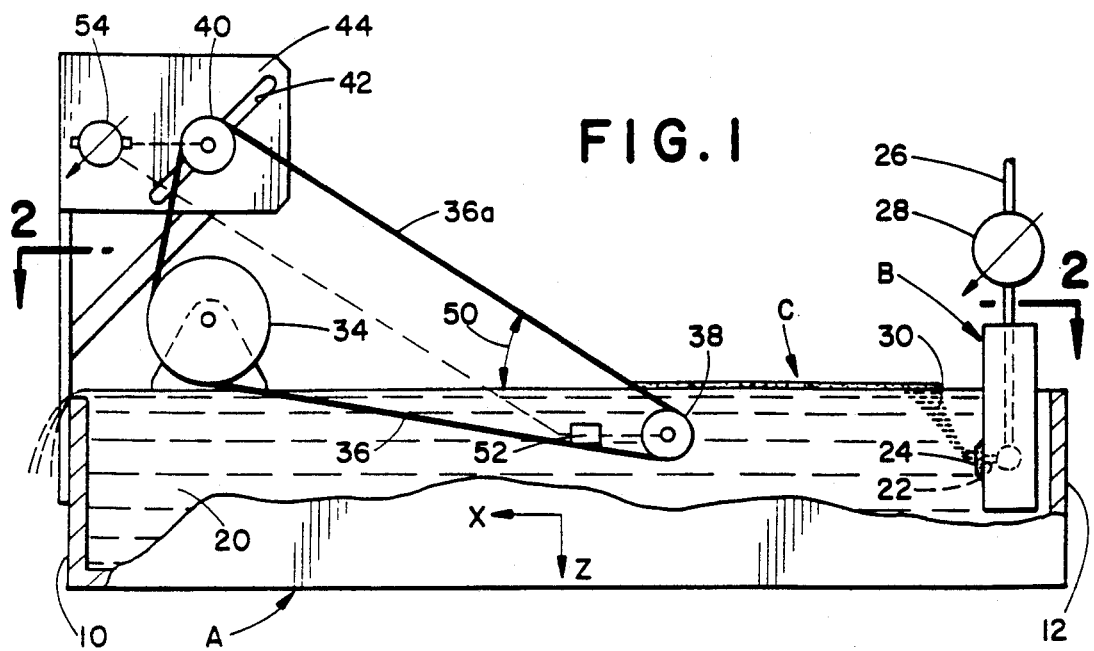
FIG. 1 is a side elevational view of an apparatus for making film in accordance with the present application.

Referring now to the drawing, wherein the showings are for purposes of illustrating certain preferred embodiments of the invention only and not for purposes of limiting same, FIG. 1 shows a liquid holding means A that may take many forms, and is illustrated as a generally rectangular trough having end walls 10, 12 and substantially parallel opposite side walls 14, 16.

Liquid holding means A holds an aqueous liquid 20 that may be distilled water or water having certain other substances dissolved therein. For example, glycerol may be mixed with water to vary the density of the aqueous liquid. In any event, liquid 20 is of a type for which polar groups of amphiphilic molecules have a strong affinity.

Delivery means B for film-forming solution extends substantially completely across liquid holding means A between side walls 14, 16 thereof and closely adjacent one end 12 thereof. Delivery means B includes an elongated outlet or slit 22 extending substantially completely and continuously across the entire width of liquid holding means A between side walls 14, 16 thereof. An elongated porous member 24 can be provided to cover or fill the delivery slit for the film-forming solution. This provides a diffuser for reducing the velocity and increasing the static pressure of the film-forming solution passing therethrough. The porous member can be a fabric wick, or can be an open cell porous material such as air stone or sponge.

When it is stated that outlet or slit 22 and diffuser 24 extend substantially continuously and completely across the entire width of liquid holding means A, it will be recognized that it is possible to provide a plurality of closely spaced slits or holes in delivery means B. Thus, while a plurality of individual streams of film-forming solution would be delivered, they are so closely spaced together across the width of liquid holding means A that they merge with one another shortly after delivery to provide a substantially continuous curtain of film-forming solution across the entire width of liquid holding means A.

Delivery means B can simply be an elongated tube with closed ends and having an elongated outlet slit extending longitudinally thereof. Obviously, internal baffles or variations in the cross-sectional area of the passages can be provided for enabling substantially uniform delivery of film-forming solution across the entire width of the delivery means and the liquid holding means.

Film-forming solution is delivered through a suitable conduit 26 and adjustable valve 28 to delivery means B. This makes it possible to vary the delivery rate of the film-forming solution and to vary the pushing force provided on the solidified film being formed. Obviously, other arrangements, such as a variable speed pump, can also be provided to vary the delivery rate of the film-forming solution.

In the arrangement shown in FIG. 1, the outlet 22 and diffuser 24 are located beneath the upper surface of aqueous liquid 20. With this advantageous arrangement, solvent in the film-forming solution dissolves in aqueous liquid 20 instead of flashing off into the atmosphere.

End 10 of liquid holding means A can be slightly smaller in height than end 12 so that aqueous liquid 20 would continuously flow at a slow rate over end 10. A suitable inlet is then provided for liquid holding means A to continuously supply fresh or reconditioned aqueous liquid 20 to liquid holding means A.

As film-forming solution 30 is delivered into aqueous liquid 20 by delivery means B, it floats to the surface of aqueous liquid 20 and solidifies into a self-assembling molecular film C.

Film pick-up or removal means is provided for removing film C from the surface of aqueous liquid 20. In one arrangement, a roll 34 of plastic or metal foil, wax paper, release grade polyethylene, or polymeric materials having a release grade silicone or polyethylene layer on the surface thereof is provided. The roll of material 34 provides a web 36 extending substantially completely across the width of liquid holding means A between side walls 14, 16 thereof.

Web 36 travels around a roll 38 and then to a take-up roll 40 mounted by adjustable mounting means such as elongated slots 42 in mounting members 44. Adjustment of take-up roll 40 makes it possible to vary the pick-up angle 50 between the upper surface of aqueous liquid 20 and external web portion 36a. Angle 50 should be less than around 45°, and most preferably should be less than around 30°.

An adjustable angular velocity detector 52 may be connected with roll 38 and with a variable speed drive motor 54 for take-up roll 40 in order to provide movement of web 36 at a substantially constant velocity. Adjustment of angular velocity detector 52 makes it possible to increase or decrease the velocity of the web to vary the rate at which film C is removed from aqueous liquid 20. Solidified self-assembling molecular film C attaches itself to web 36 by molecular attraction and travels with web 36 to take-up roll 40.

As film C solidifies on the surface of aqueous liquid 20, its amphiphilic molecules become frozen because the polar groups attach themselves to the surface of the aqueous liquid. Prior to freezing in place, the molecules are allowed to arrange themselves in their natural equilibrium condition. No external forces are provided which force the molecules to arrange themselves in an unstable condition or beyond their natural equilibrium condition. However, in accordance with the present application, a direction is provided in which the molecules can arrange themselves into aligned units that self-assemble in aligned relationship to one another.

In part, this is made possible by extruding the film-forming solution through a very narrow slit to shear the film-forming solution as it is delivered, and also by delivering the film-forming solution across substantially the entire width of liquid holding means A between side walls 14, 16 thereof. With the film-forming solution extending in a substantially continuous curtain across the entire width of liquid holding means A as it is delivered by delivery means B, solidification takes place with the film and film-forming solution transversely confined between side walls 14, 16.

Figure 3:
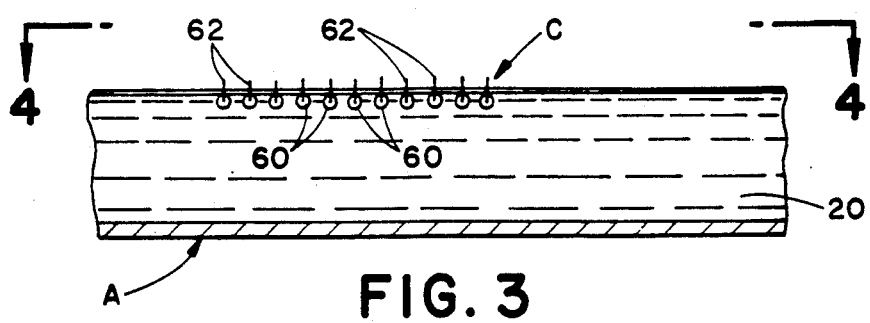
FIG. 3 is a partial cross-sectional elevational view showing amphiphilic molecules solidified on the surface of an aqueous liquid.

FIG. 3 shows film C having polar groups 60 on amphiphilic molecules attracted to aqueous liquid 20, while non-polar groups 62 extend away from aqueous liquid 20.

Figure 4:
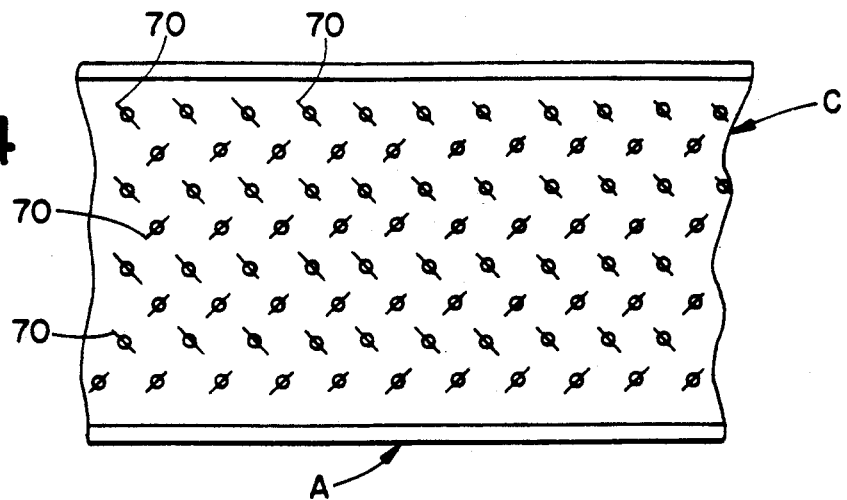
FIG. 4 is a plan view taken generally on line 4—4 of FIG. 3 and showing the ordered state of the molecules as would be determined by x-ray diffraction.

FIG. 4 shows molecules 70 as being ordered within film C. Thus, molecules 70 self-assemble in their natural equilibrium ordered condition. The molecules are ordered in the sense that they are assembled in a uniform relationship relative to one another as opposed to being randomly distributed in a disordered manner. Molecules are ordered on a micron level which can be determined by x-ray diffraction.

Figure 5:
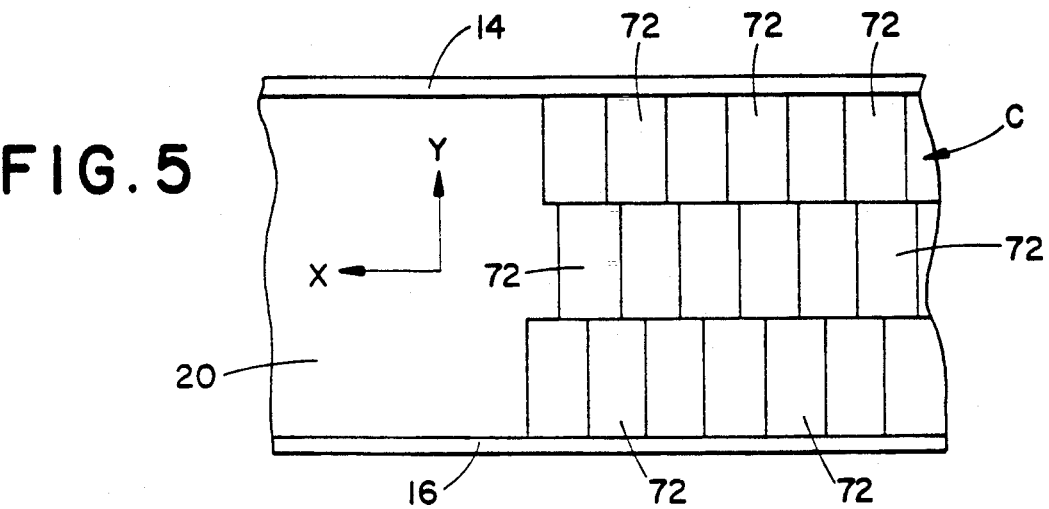
FIG. 5 is a view similar to FIG. 4 and showing the oriented nature of the crystals or aligned units in which the molecules are arranged as would be determined by use of an optical microscope.

Molecules 70 arrange themselves into crystals or aligned units 72 in FIG. 5. Although many aligned units are not crystals, they appear to be crystals when viewed with an optical microscope. Therefore, whether the molecules are arranged in crystals or only aligned units, both arrangements will be referred to as aligned units 72. Aligned units 72 are oriented relative to one another in both x and y directions. That is, in a direction parallel to film-forming direction x and in direction y transverse or perpendicular to film-forming direction x. By confining the film-forming solution between side walls 14, 16, aligned units 72 are made to orient themselves relative to one another both longitudinally and transversely of liquid holding means A. This provides a solidified film having more uniform properties than heretofore possible.

Figure 6:
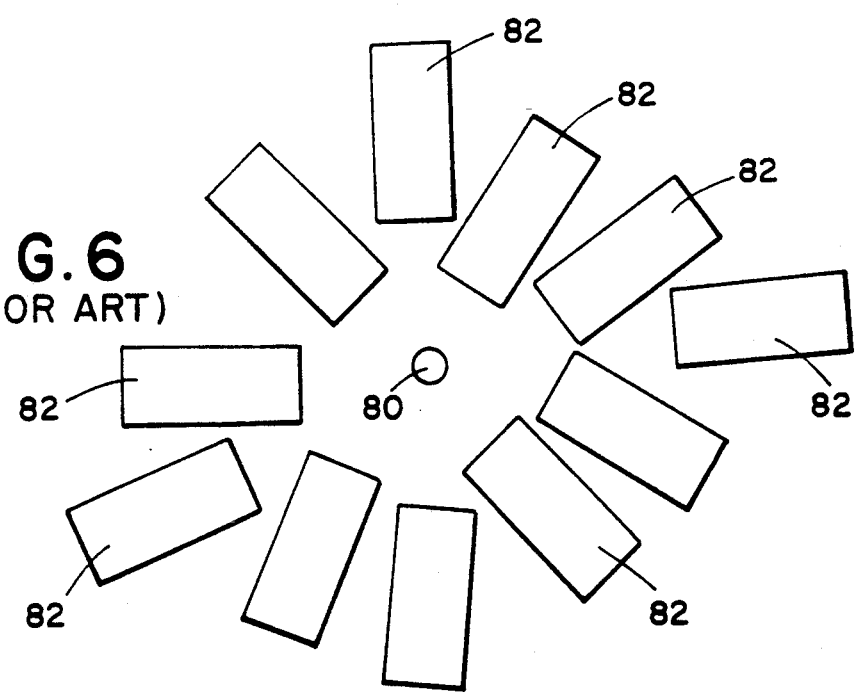
FIG. 6 is an arrangement showing how the aligned units defined by the crystals or amorphous strips appear in prior art film.

FIG. 6 shows a prior art arrangement wherein a drop or supply of film-forming solution 80 placed on the surface of an aqueous liquid solidifies into a thin film having units 82 that are completely disoriented and randomly distributed relative to one another.

Figure 7:
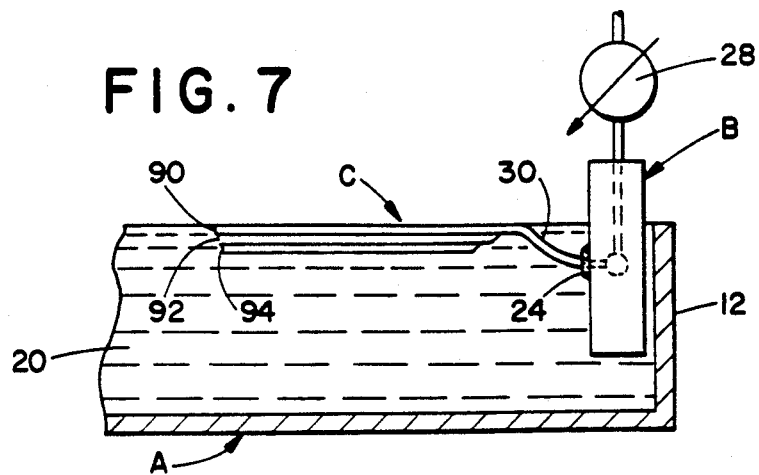
FIG. 7 is a partial cross-sectional side elevational view showing film being formed by the simultaneous formation of a plurality of individual layers or self-assembling molecular membranes.

FIG. 7 shows film C as including a plurality of individual layers or membranes 90, 92 and 94. It has been found that film-forming solution 30 delivered by delivery means B simultaneously forms multilayers 90, 92 and 94. It is not completely understood how this takes place but seems to follow bubble formation phenomenon. It is possible that additional layers form below an initial layer, possibly above it, or both. In any event, it has been found that a plurality of individual layers form and are separated from one another by an extremely thin film or bearing layer of aqueous liquid.

The number of layers 90, 92, 94 that are formed, and thereby the thickness of film C, can be varied by varying the delivery rate of film-forming solution 30, and/or by varying the rate at which solidified film C is removed from the aqueous liquid. Obviously, both delivery and removal can be controlled to vary the film thickness and the number of layers or self-assembling molecular membranes that are formed.

The film-forming solution 30 provided by delivery means B provides a pushing force on film C as it solidifies, while the pick-up or removal means provides a pulling force on such film. At least one of such forces is varied to vary the film thickness and the number of simultaneous multilayers that are formed. Each layer 90, 92, 94 is a monomolecular membrane, and such membranes are assembled to form a multi-molecular film C.

The manner in which the thickness of the film can be varied can be demonstrated with the following calculations:

$dz/dt = (cq - pWvz)/pWL$
$dz/dt$ = rate of change in film thickness (cm/sec)
$c$ = concentration of solution (g/ml)
$q$ = flow rate (ml/sec)
$p$ = nanoFILM density (g/ml)
$W$ = nanoCOATER width (cm)
$v$ = pick-up velocity (cm/sec)
$z$ = film thickness (cm)
$L$ = distance between extruder and the film pick-up or removal device (cm)
at steady state ($dz/dt = 0$) therefore,
$z = cq/pWv$ or $z = [cq]/[pWv]$ or $z$ = [PUSH]/[PULL]
TYPICAL EXAMPLE
[PUSH]
if $c = 0.1$ g/ml
if $q = 0.083$ ml/sec (5 ml/min)
then,
[PUSH] = 0.008 g/sec or
[PUSH] = mass flow rate
[PULL]
if $p = 1$ g/ml
if $W = 36$ cm  (14 in)
if $v = 15$ cm/sec  (6 in/sec)
then,
[PULL] = 542 g/cm-sec or
[PULL] = mass flow rate per unit thickness and, -continued $$\frac{[\text{PUSH}]}{[\text{PULL}]} = 1.54 \times 10^{-5} \text{ cm} = 154 \text{ nanometers}$$

Figure 8:
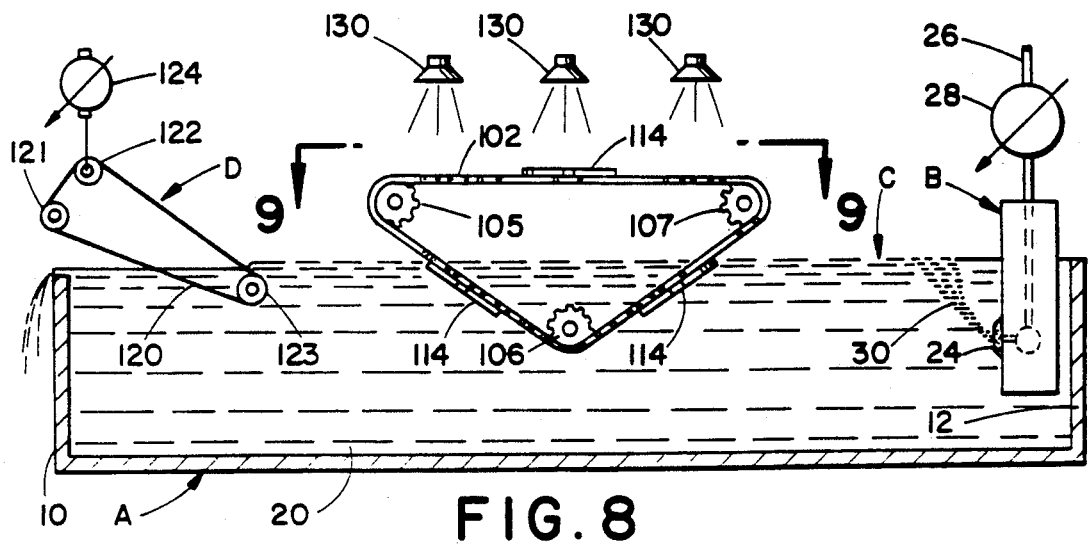
FIG. 8 is a side elevational view showing an arrangement for coating small articles with film made in accordance with the present application.
Figure 9:
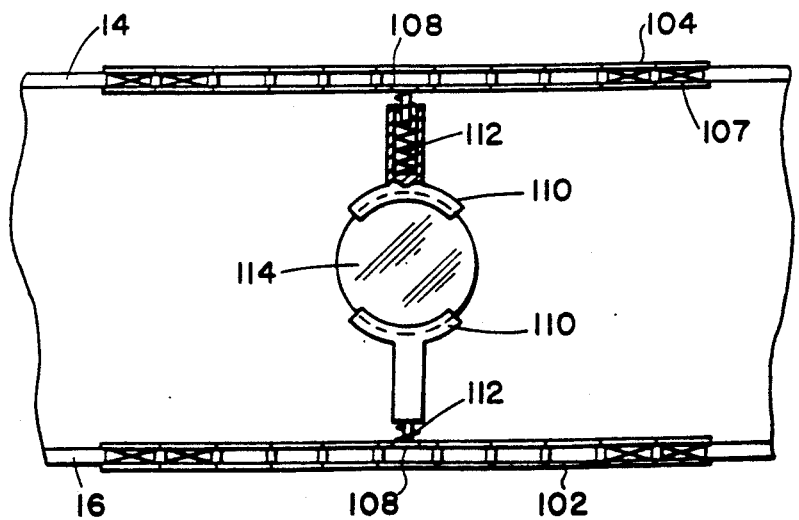
FIG. 9 is a partial top plan view taken generally on line 9—9 of FIG. 8.

FIGS. 8 and 9 show a pair of spaced-apart chains 102, 104 extending around sprockets 105-107, at least one pair of which is rotatably driven. Small article holding means in FIG. 9 includes clamps 108 that are clamped on chains 104 and have oppositely disposed arcuate supports 110 connected with clamps 108 by telescoping spring loaded connections 112. Spring loaded connections 112 yieldably bias arcuate supports 110 toward one another.

An article 114 is shown as being held between supports 110. As articles 114 travel through film C, a coating of film C attaches to the surfaces of the articles.

Film removal means D is shown as being in the form of a continuous web 120 extending around rollers 121-123, at least one of which is rotatably driven by a variable speed motor 124. Film removed from aqueous liquid 20 by removal means D can simply be discarded if so desired. This arrangement makes it possible to vary the thickness of film C and thereby the coating thickness applied to articles 114.

Drying means 130 may be provided above articles 114 after they have been coated by film C. Obviously, the conveyor chains can be arranged in an elongated path with heating means 130 located remote from liquid holding means A where articles 114 can be removed and inserted.

The small articles that are provided with a film coating can be of many types, such as lenses.

Figure 10:
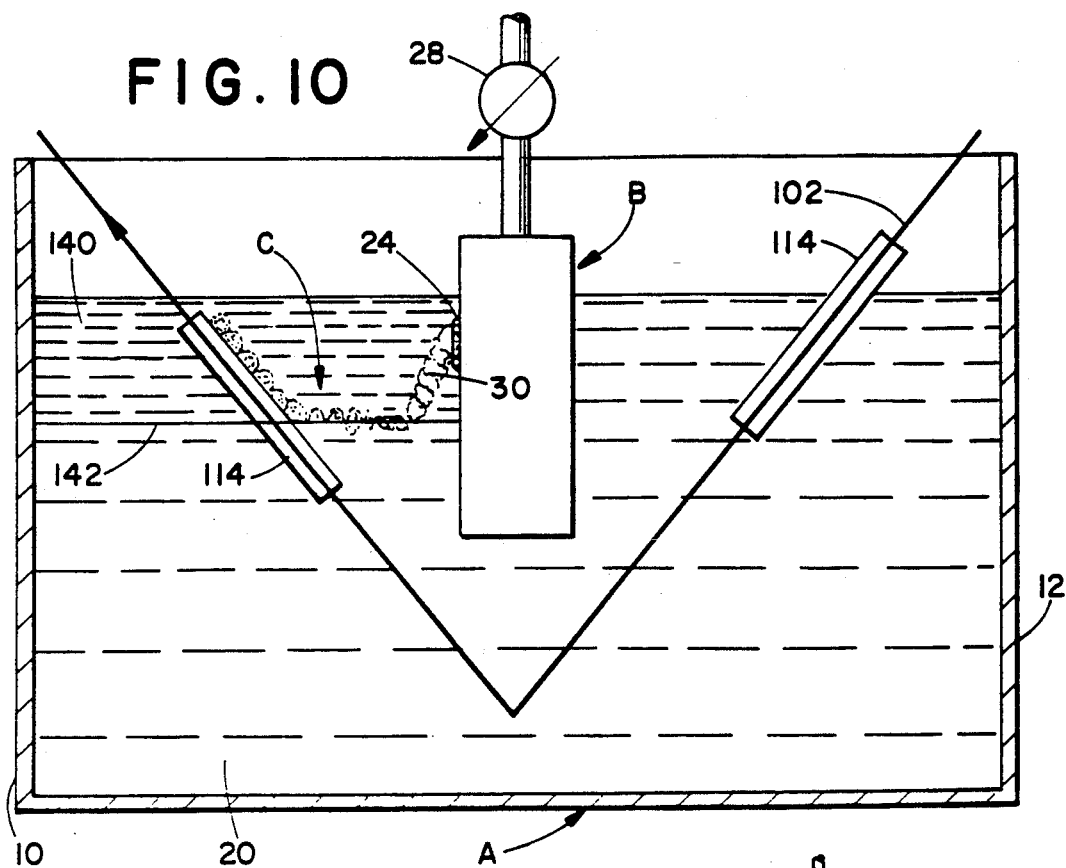
FIG. 10 is a side elevational view showing another arrangement for coating small articles with film.

FIG. 10 shows another arrangement wherein a layer 140 of a solvent such as octane or hexane or other alkanes that are immiscible; water is positioned on one side of delivery means B and end wall 10. Layer 140 floats on aqueous liquid 20 to provide an interface 142 therewith. The outlet slit for film-forming solution delivery means B and the diffuser 24 are located for delivering film-forming solution 30 within layer 140. The film-forming solution 30 then sinks through layer 140 to interface 142 where it solidifies into thin film C.

The film-forming solution can also be delivered into an aqueous liquid layer depending upon the film-forming substrate used by lowering the diffuser 24 in the water layer. This then will form the thin film at the interface.

The arrangement of FIG. 10 has been shown shortened for convenience of illustration and it will be recognized that it could be elongated to have the removal means for removing film at a predetermined rate to vary the thickness thereof. In the arrangement of FIG. 10, e.g., the film-forming solution 30 can be comprised of silanes. The arrangement of FIG. 10 makes it possible to solidify film in an anerobic environment, and the solvent used in the film-forming solution can be polar or non-polar.

Figure 11:
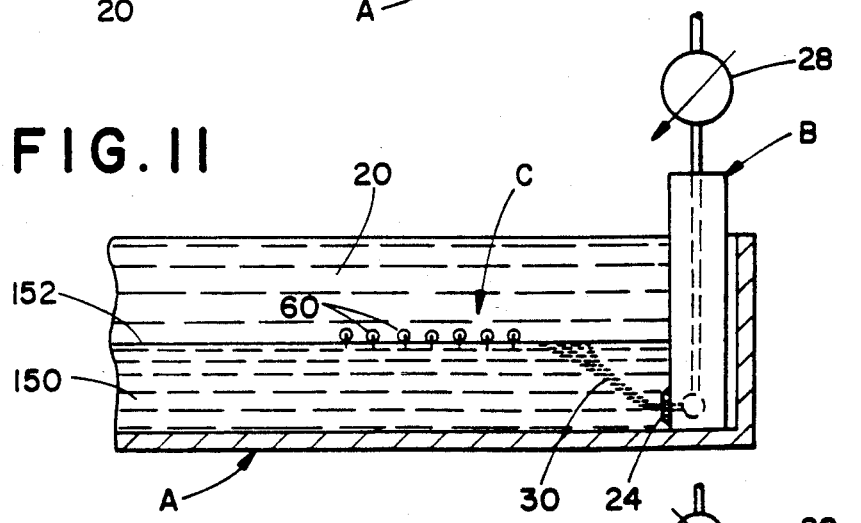
FIG. 11 is a side elevational view showing another arrangement for making film in accordance with the present application.

FIG. 11 shows another arrangement wherein a layer 20 of aqueous liquid floats on a bottom layer 150 having a density greater than water. For example, layer 150 can be a phenylmethyl polysiloxane. One brand of such material is available as 710 fluid from Dow Corning. This liquid has a density of approximately 1.11 grams per milliliter and is immiscible in water. Film-forming solution delivery means B is positioned with its outlet and diffuser 24 located for deliverying film-forming solution 30 within layer 150. Film-forming solution 30 then rises to interface 152 between layers 20, 150 where film C solidifies with the polar groups 60 of the amphiphilic molecules attracted to layer 20. This is another arrangement that makes it possible to solidify film C in an anerobic environment.

Figure 2:
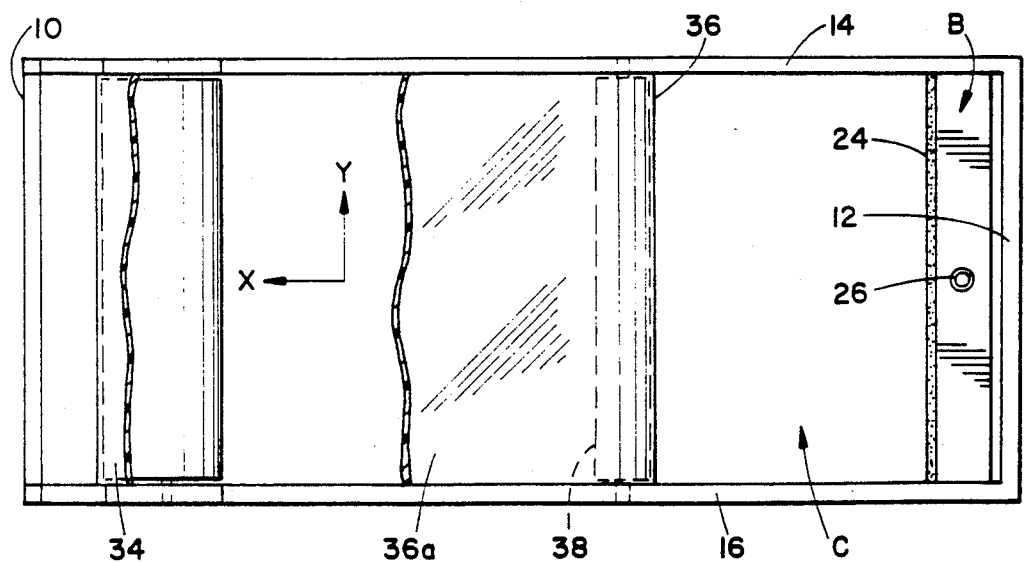
FIG. 2 is a partial top plan view taken generally on line 2—2 of FIG. 1.
Figure 12:
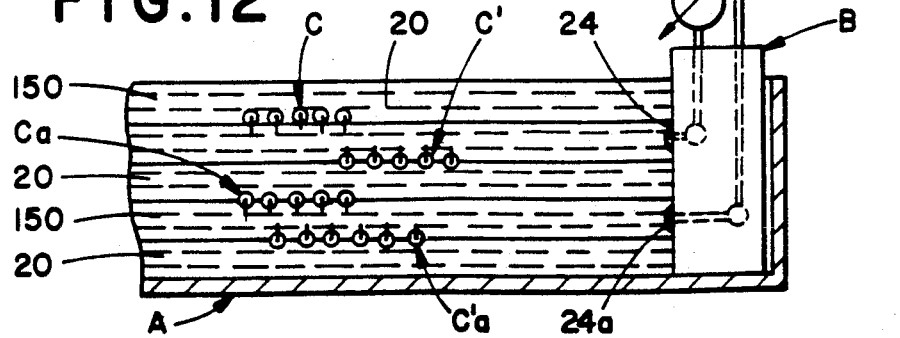
FIG. 12 is a side elevational view showing still another arrangement for making multilayer film in accordance with the present application by simultaneously forming individual films or layers of different materials.

FIG. 12 shows another arrangement wherein a plurality of layers 20 of aqueous liquid are separated from one another by a plurality of layers 150 of a liquid having a density greater than water and being immiscible in water. The densities of the various layers can be adjusted as by adding various amounts of glycerol to the aqueous liquid, and by adding octane or hexane to the other layers. Film-forming solution delivery means B is provided with two different valves 28, 28a for supplying two different types of film-forming solutions through outlet slits and diffusers 24, 24a. This makes it possible to simultaneously form two films C and C' from one outlet or diffuser 24, and two additional different films Ca and Ca' from the other delivery diffuser 24a. These different films can be removed in the manner described with reference to FIGS. 1 and 2, and can be used for coating articles as suggested with reference to FIGS. 8-10.

Figure 13:
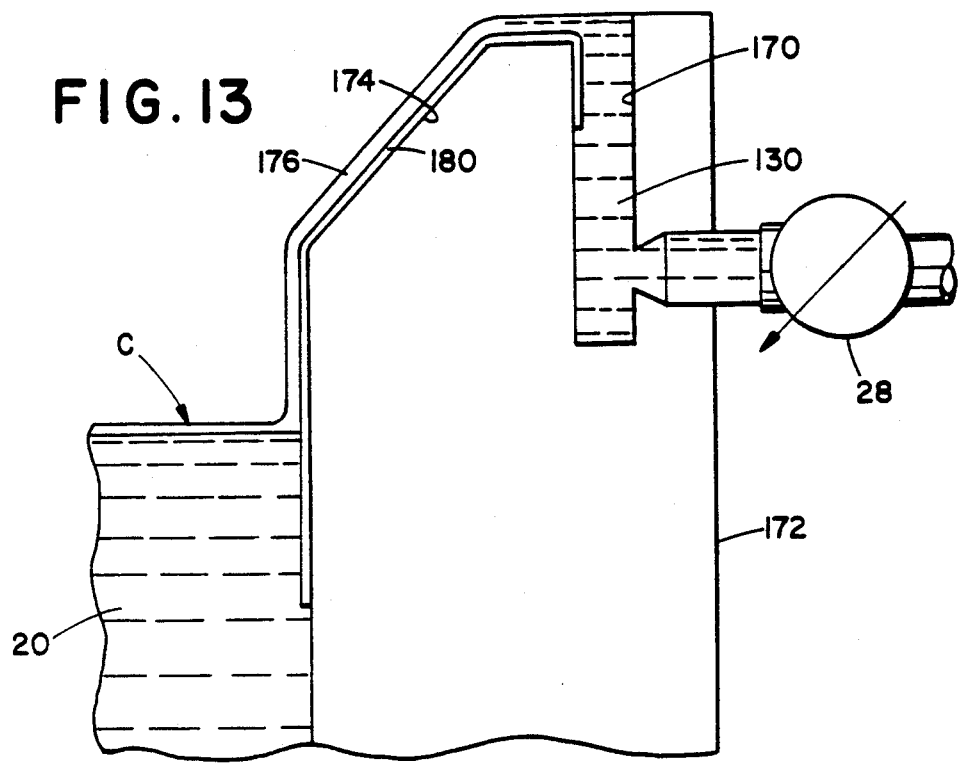
FIG. 13 is a partial side elevational view of another arrangement for delivering film-forming solution to an aqueous liquid.

FIG. 13 shows another arrangement wherein film-forming solution 30 is fed to a transversely elongated reservoir 170 in a delivery means 172 that extends substantially completely across the side walls of a liquid holding means adjacent one end thereof. A spillway 174 is provided over which film-forming solution 30 can flow in a substantially continuous curtain 176 to the surface of aqueous liquid 30 for solidification into film C. A fabric member 180 completely covering spillway 174, and extending from reservoir 170 to a location beneath the surface of aqueous liquid 20 defines flow enhancing means for enhancing the flow of film-forming solution 30 without having any localized disruptions therein. Flow enhancing means 180 can be a woven fabric such as cotton and can also take other forms. A woven cotton fabric is a particularly good flow enhancing means.

Figure 14:
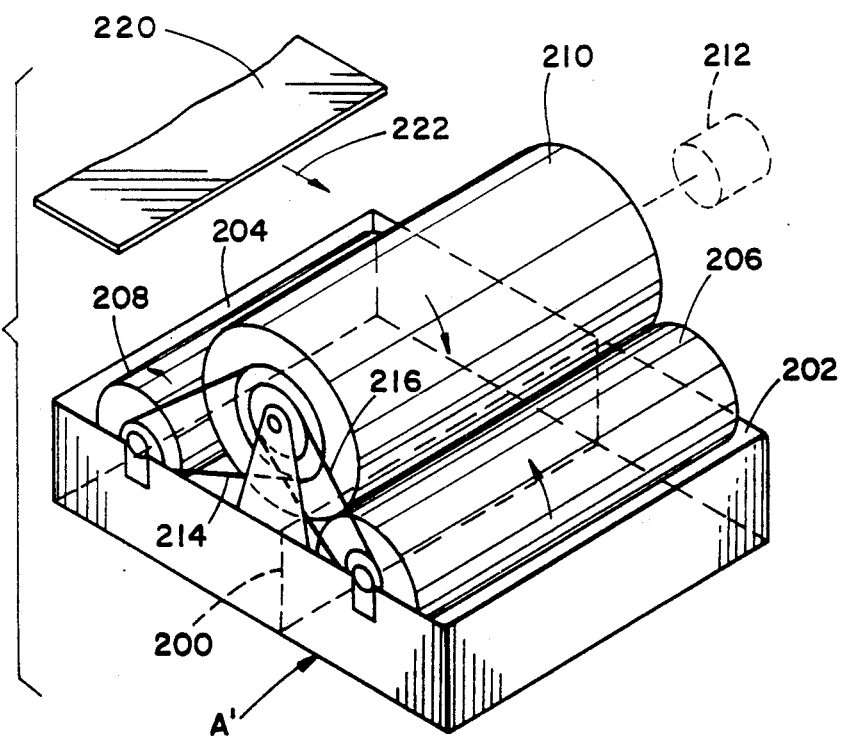
FIG. 14 is a perspective illustration of another apparatus for forming film in accordance with the present application and transferring same onto a substrate surface.

FIG. 14 shows another arrangement wherein liquid holding means A' is divided into two compartments as by a divider 200. One compartment 202 holds an aqueous liquid while the other compartment 204 holds a film-forming solution. Rotatable roller 206 is mounted for engaging an aqueous liquid within compartment 202. Roller 208 is rotatably mounted for engaging film-forming solution within compartment 204. Roller 210 is rotatably mounted between rollers 206, 208 and in an engagement therewith. Roller 210 is suitably rotatably driven as by a variable speed motor 212. Rollers 206-210 may be drivingly connected with one another as by belts 214, 216 extending around pulleys on the ends of the rollers, or they may be driven by engagement with one another.

Belts 214, 216 are preferably twisted to impart rotation of rollers 206, 208 in a direction reverse to that of roller 210. Clockwise rotation of roller 210 results in counterclockwise rotation of 206 which transfers an aqueous liquid from compartment 202 onto the surface of roller 210. Thus, roller 210 and its outer surface becomes a movable liquid holding means for holding an aqueous liquid on which film-forming solution may solidify.

As roller 210 continues to rotate with a thin film of aqueous liquid on the outer surface thereof, roller 208 rotates in a counterclockwise direction and transfers film-forming solution from compartment 204 onto the layer of aqueous liquid on roller 210. As the film-forming solution solidifies on roller 210, it engages the surface of a substrate 220 moving longitudinally past roller 210 as indicated by arrow 222. The polar groups of the self-assembling molecular film attach themselves to the surface of substrate 220 for providing a coating thereon. Substrate 220 may be a web for storing the film or may be an article to be coated with the film. Rollers 206, 208 can be independently driven by individual variable speed motors.

In the arrangement of FIG. 14, the pulleys are preferably arranged such that roller 208 is rotating at a greater velocity than roller 210. This provides longitudinal shearing action on the film-forming solution as it is being delivered from roller 208 to roller 210, and this helps to provide ordering of the molecules and orientation of the aligned units. Instead of wetting the outer surface of roller 210 with a roller 206, it is obvious that it is possible to spray an aqueous liquid against roller 210 or to provide a porous surface on roller 210 with an aqueous liquid being supplied internally to roller 210. It is also obvious that a doctor blade or the like can be provided for obtaining a uniform film of aqueous liquid on the outer surface of roller 210.

The film-forming apparatus shown in FIG. 14 can be duplicated on the opposite side of substrate 220 for providing a self-assembling molecular film on both opposite surfaces thereof simultaneously.

Film-forming solutions used in accordance with the present application can be made by dissolving an amphiphilic material or "amphiphile," having low solubility and volatility, into a low-boiling organic solvent, such as chloroform, hexane, methylene chloride or the like, or into a polar solvent, such as ethanol, acetone, propylene carbonate or the like.

Materials that can be used to form film in accordance with the present application include, but are not necessarily limited to, the following:

Amphiphilic Acids

Those amphiphiles which include carboxylic acid (—COOH) groups, or their associated salts, as the major polar component. The apolar component typically consists of a long linear alkane segment. Examples include brassidic acid, elaidic acid, stearic acid, arachic acid, and other naturally occurring fatty acids, as well as synthetic compounds which include diacetylene, vinyl-unsaturated, or fused linear or branched aromatic moities within the apolar regions. (A balance must be achieved, as is well known to those skilled in the art, between the length of the alkane or aromatic apolar moities, and the acid moity, in order to provide true monolayer-forming character on a water surface.)

Amphiphilic Alcohols

Those amphiphiles which include alcohol (-OH) groups as the major polar component. The apolar component typically consists of a long linear alkane segment. Examples include brassidic alcohol, elaidic alcohol, stearic alcohol, arachic alcohol, and other fatty alcohols, as well as synthetic alcohol compounds, which include diacetylene, vinyl-unsaturated, or fused linear or branched aromatic moieties within the apolar regions.

Amphiphilic Amides

Those amphiphiles which include amide (—NHCO) groups as the major polar component. The apolar component typically consists of a long linear alkane segment. Examples include brassidic amide, elaidic amide, stearic amide, arachic amide, and other fatty amides, as well as synthetic amide compounds, which include diacetylene, vinyl-unsaturated, or fused linear or branched aromatic moities within the apolar regions.

Amphiphilic Amines

Those amphiphiles which include primary (—NH$_2$), secondary (—NHR), or tertiary amine (—NR$_2$) groups as the major polar component. The apolar component typically consists of a long linear alkane segment. Examples include brassidic amine, elaidic amine, stearic amine, arachic amine, and other fatty amines, as well as synthetic amine compounds, which include diacetylene, vinyl-unsaturated, or fused linear or branched aromatic moities within the apolar regions.

Amphiphilic Cyanides

Those amphiphiles which include cyanide (—CN) groups as the major polar component. The apolar component typically consists of a long linear alkane segment. Examples include brassidic cyanide, elaidic cyanide, stearic cyanide, arachic cyanide, and other fatty cyanides, as well as synthetic cyanide compounds, which include diacetylene, vinyl-unsaturated, or fused linear or branched aromatic moities within the apolar regions.

Amphiphilic Nitrates

Those amphiphiles which include nitrate (—NO$_2$) groups as the major polar component. The apolar component typically consists of a long linear alkane segment. Examples include brassidic nitrate, elaidic nitrate, stearic nitrate, arachic nitrate, and other fatty nitrates, as well as synthetic nitrate compounds, which include diacetylene, vinyl-unsaturated, or fused linear or branched aromatic moities within the apolar regions.

Amphiphilic Phosphates

Those amphiphiles which include phosphate (—PO$_4$) groups as the major polar component. The apolar component typically consists of a long linear alkane segment. Examples include brassidic phosphate, elaidic phosphate, stearic phosphate, arachic phosphate, and other fatty phosphates, as well as synthetic phosphate compounds, which include diacetylene, vinyl-unsaturated, or fused linear or branched aromatic moities within the apolar regions.

Amphiphilic Sulphonates

Those amphiphiles which include sulphonate (—SO$_3$) groups as the major polar component. The apolar component typically consists of a long linear alkane segment. Examples include brassidic sulphonate, elaidic sulphonate, stearic sulphonate, arachic sulphonate, and other fatty sulphonates, as well as synthetic sulphonic compounds, which include diacetylene, vinyl-unsaturated, or fused linear or branched aromatic moities within the apolar regions.

Amphiphilic Silanes

Those amphiphiles which include silanol Si-(X)$_n$. Where X=halogens, hydroxy, alkoxy, amine or imine or similar groups as the major polar component, and n=1-3. The apolar component typically consists of a long linear alkane segment. Examples include brassidic silane, elaidic silane, stearic silane, arachic silane, and other fatty silanes with alkyl chain $C_1$-$C_{16}$, as well as synthetic silane compounds, which include diacetylene, vinyl-unsaturated, or fused linear or branched aromatic moities within the apolar regions. Silanes can be used to form film in an anerobic environment, and the solvent used can be either polar or non-polar. The use of non-polar solvents was not heretofore possible.

In addition, amphiphiles having, in their apolar regions, moities or structures comprising organic dyes with and without metal substituents (e.g., pthalocyanines, porphyrins, phenol blues, etc.), inorganic dyes (e.g., chromates, iron oxides, etc.), nonlinear oscillators (e.g., p-nitroanaline and derivates, etc.), and/or photoconductors (e.g., carbazoles, acridones, etc.) are also useful in accordance with the invention.

The general criteria for all of the amphiphiles useful in accordance with the invention is that they should be capable of forming a true self-assembling molecular layer on a water surface (water/gas or water/oil interface), when spread from a solvent. Finally, the amphiphiles useful in accordance with the invention must be virtually insoluble in aqueous media, at certain pHs, with/without certain salt types or concentrations added to the aqueous media. Nearly all commercial polymers can be used to form film in accordance with the present application including, but not limited to, polyesters, polycarbonates, polyamides and fluorocarbons. Materials that form self-assembling molecular multilayers are particularly advantageous to form film in accordance with the present application.

In contrast with known techniques for forming monolayer-like membranes by utilizing very dilute solutions of monomolecular layer-forming materials in a low-boiling solvent, it is preferred in the present invention to use a concentrated solution of such materials, such as the foregoing preferred amphiphilic compounds, in such a solvent. Preferably, concentrations of about 0.01 mg/ml to about 1000 mg/ml are utilized. Optimally, solutions of a concentration of about 0.5 mg/ml to about 20 mg/ml are used. Film-forming solutions are made by dissolving a suitable amphiphile in a suitable low-boiling organic solvent. Usable solvents include, but are not limited to, chloroform, hexane and methylene chloride, and polar solvents such as ethanol, acetone and propylene carbonate.

In previous arrangements, the monolayer formed from the film-forming solution was compressed in order to compress the molecules together in the plane of the film. In contrast, the present application allows the molecules to assemble in their natural equilibrium state. In accordance with the present application, the solvent in the film-forming solution preferably dissolves into an aqueous liquid instead of flashing off into the atmosphere. In addition, the ratio of the delivery rate of film-forming solution to the pick-up rate of solidified film is directly proportional to the film thickness and the number of layers in the film. It is desirable that the delivery means for the film-forming solution provides a pressure drop across the delivery slit that is very low, from about 0 to about 5 psi.

When the film-forming solution contacts the aqueous liquid, an initial film forms and extends across the confined surface area of the trough aqueous liquid. As additional film-forming material is delivered and contacts the aqueous liquid, the film thickens until the desired multi-molecular film thickness is reached. The newly delivered film-forming solution continues to thicken the film by climbing on top of or underneath the trailing edge of the previous monomolecular layer. The amphiphilic molecules simultaneously orient themselves in the z dimension of FIG. 1 perpendicular to the surface of the aqueous liquid. The simultaneous volatization or dissolution of the solvent from the amphiphile film-forming solution completes the formation of the film in which the molecules are ordered and also arranged in aligned units that are oriented in the x and y directions of FIG. 2.

The use of film-forming solutions that form bubbles are particularly advantageous for making films in accordance with the present application. Film in accordance with the application comprises a plurality of aligned units arranged side-by-side and end-to-end. 100x examination using an optical microscope can be used to distinguish the ordered and oriented film of the present application from a single crystal in a prior art-type of film.

Film made in accordance with the present application can be made in many different thicknesses, but is preferably less than about 6 microns thick. Film of the present application is also characterized by its uniform thickness throughout its area made possible by the monomolecular layers of uniform thickness being intimately attached to one another at their interfaces in a multilayer film.

Certain monomers can react to form polymers in the solid state and reach equilibrium as substantially perfect crystals. The particularly preferred film or membrane of the present application has molecules that are crystallizable, polymerizable and/or cross-linkable. Examples of materials having molecules that are polymerizable in the solid state are the aforementioned synthetic compounds which include diacetylene and vinyl-unsaturated, along with the aforementioned silanol Si $(X)_n$.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A film made from a film-forming solution containing amphiphilic molecules that are capable of spontaneous self-assembly on a surface on which they are placed, said film having a length, a width and a thickness respectively corresponding to x,y and z directions, said molecules being ordered in said film substantially parallel to said Z direction by being assembled in a uniform relationship relative to one another as opposed to being randomly distributed in a disordered manner, said molecules being arranged in said film in a plurality of aligned units, and said aligned units being oriented relative to one another in both said X and Y directions, whereby the film has molecular alignment in all three of its length, width and thickness directions to provide substantially uniform properties throughout the entire area of the film.

2. The film of claim 1 wherein said film comprises a single monomolecular layer.

3. The film of claim 1 wherein said film comprises a plurality of monomolecular layers.

4. The film of claim 3 wherein said layers include layers made from different film-forming solutions.

5. The film of claim 1 wherein said film-forming solution comprises a self-assembling molecular material.

6. The film of claim 1 wherein said aligned units are crystalline.

7. The film of claim 1 wherein said molecules are polymerizable in the solid state.

8. The film of claim 1 coated on a surface of a substrate.

9. The film of claim 8 wherein said film is self-adhered to said substrate surface by means of chemical bonding, dipolar attraction, hydrogen bonding and van der Waals forces.

10. The film of claim 1 wherein said film has a substantially uniform thickness of less than about 6 microns.

11. The film of claim 1 wherein said film is formed from a film-forming solution that is capable of forming a monomolecular layer at an interface with an aqueous liquid.

12. The film of claim 1 wherein said film is a dried self-assembling molecular fluid membrane.

* * * * *